(12) United States Patent
Fuller et al.

(10) Patent No.: US 10,919,624 B2
(45) Date of Patent: Feb. 16, 2021

(54) UAS DISPLAY SYSTEM AND METHOD

(71) Applicant: WET, Sun Valley, CA (US)

(72) Inventors: Mark Fuller, Studio City, CA (US); Dezso Molnar, Davis, CA (US); James Doyle, Burbank, CA (US); John Canavan, Burbank, CA (US)

(73) Assignee: WET, Sun Valley (CA)

( * ) Notice: Subject to any disclaimer, the term of this patent is extended or adjusted under 35 U.S.C. 154(b) by 0 days.

(21) Appl. No.: 16/531,063

(22) Filed: Aug. 4, 2019

(65) Prior Publication Data

US 2020/0039643 A1 Feb. 6, 2020

Related U.S. Application Data

(60) Provisional application No. 62/715,257, filed on Aug. 6, 2018.

(51) Int. Cl.
| | |
|---|---|
| *B64C 39/02* | (2006.01) |
| *B64D 1/18* | (2006.01) |
| *B64D 35/04* | (2006.01) |
| *B64D 47/02* | (2006.01) |
| *B64F 1/00* | (2006.01) |
| *B60L 53/12* | (2019.01) |

(52) U.S. Cl.
CPC .......... *B64C 39/022* (2013.01); *B64C 39/024* (2013.01); *B64D 1/18* (2013.01); *B64D 35/04* (2013.01); *B64D 47/02* (2013.01); *B64F 1/00* (2013.01); *B60L 53/12* (2019.02); *B60L 2200/10* (2013.01); *B64C 2201/027* (2013.01); *B64C 2201/126* (2013.01); *B64C 2201/143* (2013.01); *B64C 2201/146* (2013.01); *B64D 2203/00* (2013.01)

(58) Field of Classification Search
CPC .................... G06F 11/2023; G06F 2201/82
USPC ............................................................. 52/27
See application file for complete search history.

(56) References Cited

U.S. PATENT DOCUMENTS

| | | | |
|---|---|---|---|
| 9,612,264 B2 | 4/2017 | Bruins et al. | |
| 9,698,652 B2* | 7/2017 | Sia ............................ | F03D 5/00 |
| 10,168,695 B2* | 1/2019 | Barnickel ............ | G05D 1/0033 |
| 2015/0353192 A1* | 12/2015 | Morrison ................ | B64C 27/32 |
| | | | 244/17.23 |
| 2019/0097722 A1* | 3/2019 | McLaurin .......... | G02B 27/0916 |

FOREIGN PATENT DOCUMENTS

| | | |
|---|---|---|
| CN | 107308570 | 11/2017 |
| JP | 2016-210229 | 12/2016 |
| JP | 2017-105222 | 6/2017 |
| JP | 2017-177978 | 10/2017 |

* cited by examiner

*Primary Examiner* — Jeanette E Chapman
(74) *Attorney, Agent, or Firm* — Maceiko IP

(57) ABSTRACT

A system for configuring unmanned aircraft system (UAS) to a structure is disclosed. The structure may be a standing structure such as a tower. A movement system may be configured with the tower. The UASs may be tethered to the movement structure and the movement structure may move with respect to the tower.

6 Claims, 12 Drawing Sheets

UAS DISPLAY SYSTEM AND METHOD

CROSS-REFERENCE TO RELATED APPLICATION

This application claims the benefit of U.S. Provisional Application No. 62/715,257, filed Aug. 6, 2018, the contents of which are incorporated herein by reference.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to unmanned aircraft systems (UASs), including systems and methods of configuring UASs with other structures.

BACKGROUND OF THE INVENTION

Large standing structures such as observation towers, antenna towers, skyscrapers and other types of structures are prevalent in major cities of the world. However, the structures, while functional, may be visually unpleasant or unattractive.

In order to make the structures more attractive, large amounts of money is spent on the design and construction of the structures. However, as more and more structures are built, it has become more and more difficult to attain a unique style and to differentiate the structures from one another.

Accordingly, there is a need for system that may add unique and visually stimulating elements to such structures.

In addition, the use of lighted unmanned aircraft systems (UASs) as low flying lighting displays is increasing. However, the UASs tend to create a significant amount of noise pollution due to their high velocity rotor blades. In addition, the low flying lighted UASs may only be viewable from short distances due to their limited altitude. As such, their use with low level displays may be undesirable.

Accordingly, there is a need for high altitude lighting displays incorporating lighted UASs to reduce the noise pollution heard from the ground. There is also a need for high altitude lighting displays incorporating lighted UASs that can be viewed from long distances.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

The term "mechanism," as used herein, refers to any device(s), process(es), service(s), or combination thereof. A mechanism may be implemented in hardware, software, firmware, using a special-purpose device, or any combination thereof. A mechanism may be mechanical or electrical or a combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered shorthand for the term device(s) and/or process(es) and/or service(s).

In general, the system according to exemplary embodiments hereof provides the structure, mechanisms, power and control for standing structures configured with unmanned aircraft systems (UASs), water, lights, sound and other elements as described herein.

The standing structures may include tower structures, building structures, pole structures or other types of standing structures. The standing structures may be at least somewhat permanent in nature, but temporary structures may also benefit from the system. It may also be preferable that at least a portion of the structures be at least partially upright, but structures in other orientations may also be utilized with the system. The structures may be outdoor structures, indoor structures or any combination thereof.

The system may generally provide a mounting system that may configure tethered UASs to at least a portion of the standing structure. The mounting system may be movably mounted to the structure, and tethers may extend from the mounting system to the UASs. The mounting system may be moved up and down and rotated about the outer circumference of the structure, and the flight paths of the UASs may be choreographed and/or synchronized with the movement of the mounting system.

In some exemplary embodiments hereof, the mounting system my include propulsion mechanisms that may move the mounting system. In other exemplary embodiments, the UASs tethered to the mounting system may provide the propulsion and movement of the mounting system. Any combination thereof may also be utilized and is contemplated in this specification.

The system 10 and its elements may also employ water delivery devices to spray water, lights to provide illumination, sound systems to provide sound, as well as other elements. In this way, the system may provide a visually stimulating aircraft show combining flying UASs on lighted tethers spraying glowing water streams as they move up and down and rotate around the structure.

Figure 1:
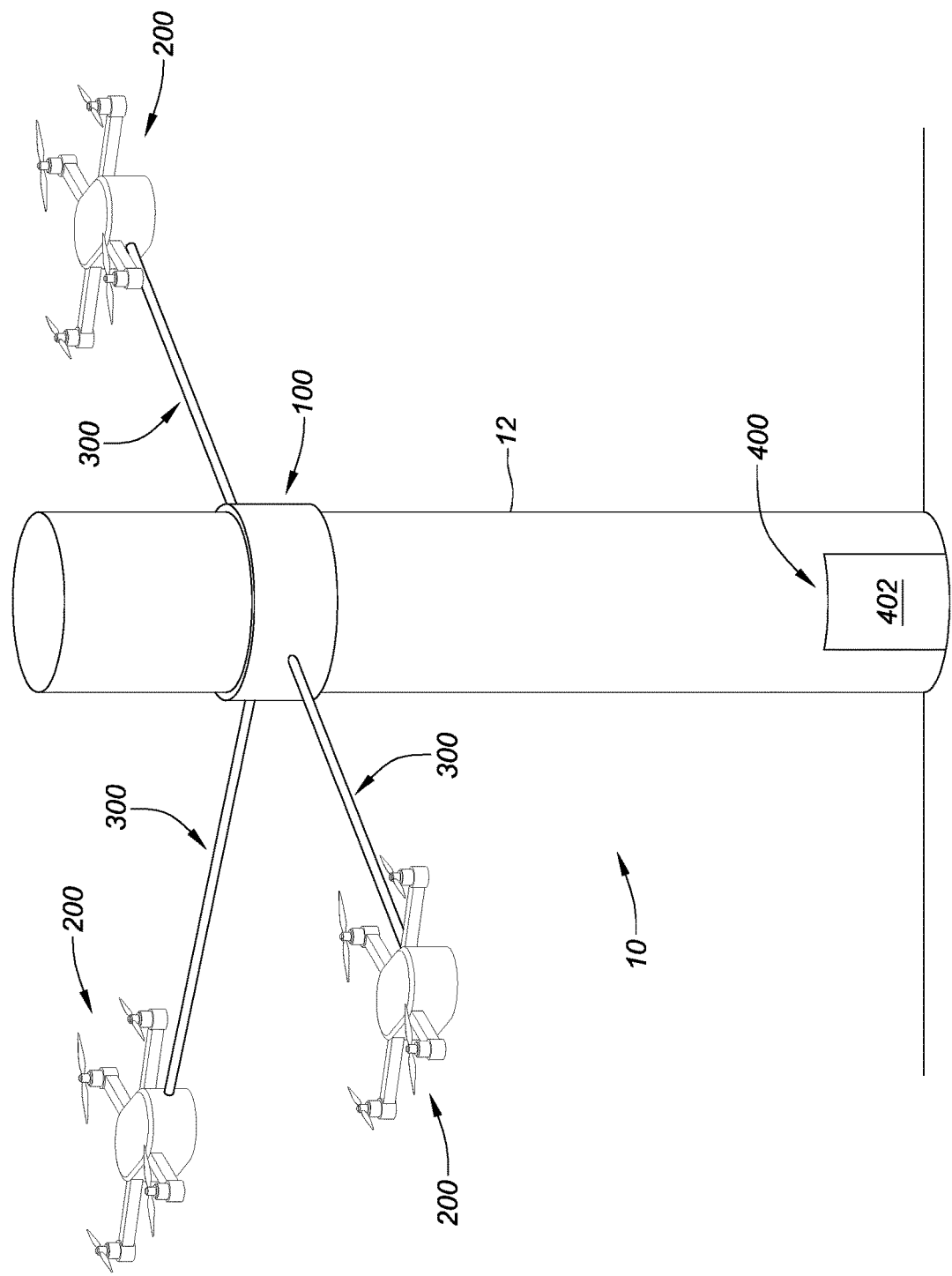
FIGS. 1-12 show aspects of a UAS system according to exemplary embodiments hereof.

In one exemplary embodiment hereof as shown in FIG. 1, the system 10 may include a mounting system 100, one or more UASs 200, a tether system 300, a control system 400 and other systems, elements, mechanisms and components that may be required by the system 10 as described in other sections. The system 10 may be configured with a standing structure 12.

For the purpose of this specification and for demonstration, the system 10, its installation, operation and method of use in some embodiments will be described in relation to a tower structure 12 (e.g. an observation tower) with a generally circular cross-sectional shape. Other embodiments may be described in relation to a structure 12 with a square cross-sectional shape or otherwise. In any event, it will be understood by a person of ordinary skill in the art, upon reading this specification, that the system 10 may be installed, configured, mounted, integrated, attached and operated with any type of structure 12 such as a skyscraper, a commercial building, a home, a museum, an antenna tower, a utility tower, a bridge, an overpass, a natural structure such as a rock formation, a mountain, a cliff or any other type of structure. The structure 12 may also exist for the purpose of supporting the UASs 300 and need not be attached or incorporated into another structure. Multiple structures 12 may also be used, attached and/or in proximity to each other. The structure 12 may vary in heights. It is also understood that the structure 12 may have any cross-sectional shape(s) or any combinations of cross-sectional shapes (e.g., circular, oval, octagonal, square, rectangular, trapezoidal, etc.), and that the type of structure 12 and the cross-sectional shape(s) of the structure 12 do not limit the scope of the system 10 in any way.

In one exemplary embodiment hereof, the system 10 may be configured with and operated with respect to a tower 12 such as an observation tower 12. The tower 12 may include an upright component that may extend vertically or at some angle to a height above the ground. For example, the observation tower 12 may extend vertically hundreds of meters above the ground so that viewers located in the top portions of the observation tower 12 may view long distances of adjacent landscapes.

The Mounting System

Referring now to FIGS. 2-5, the mounting system 100 of the system 10 according to exemplary embodiments hereof will be described in further detail. One purpose of the mounting system 100 may be to configure the UASs 200 and/or the tether system 300 with the towers 12. The mounting system 100 may also be referred to as a movement system 100.

Figure 2:
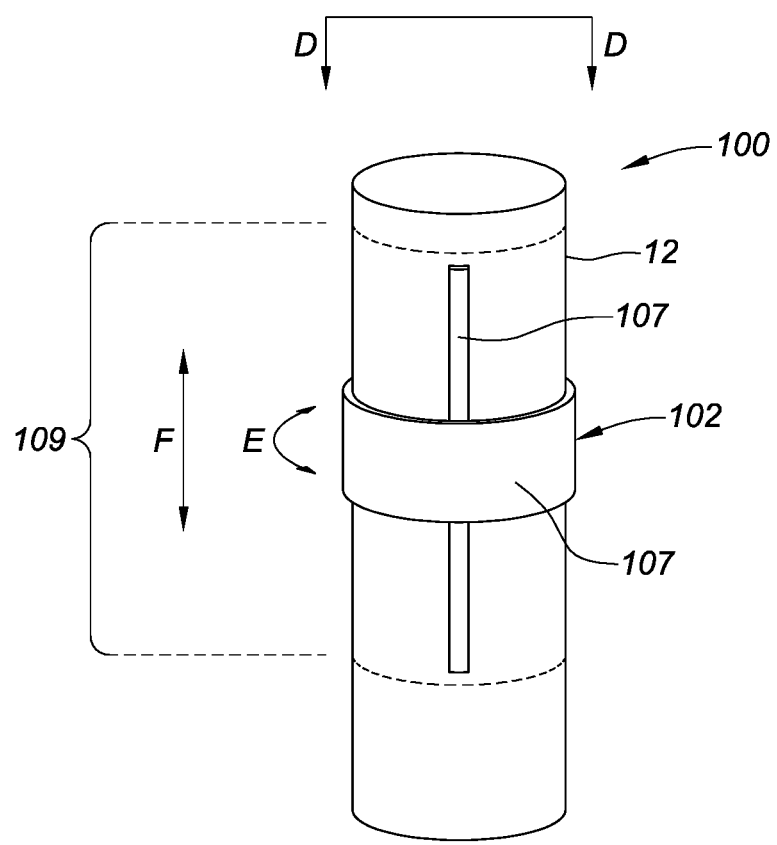
Figure 3A:
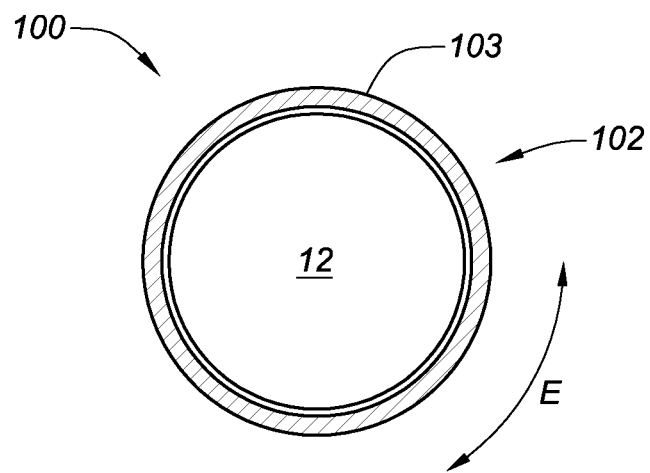
Figure 3B:
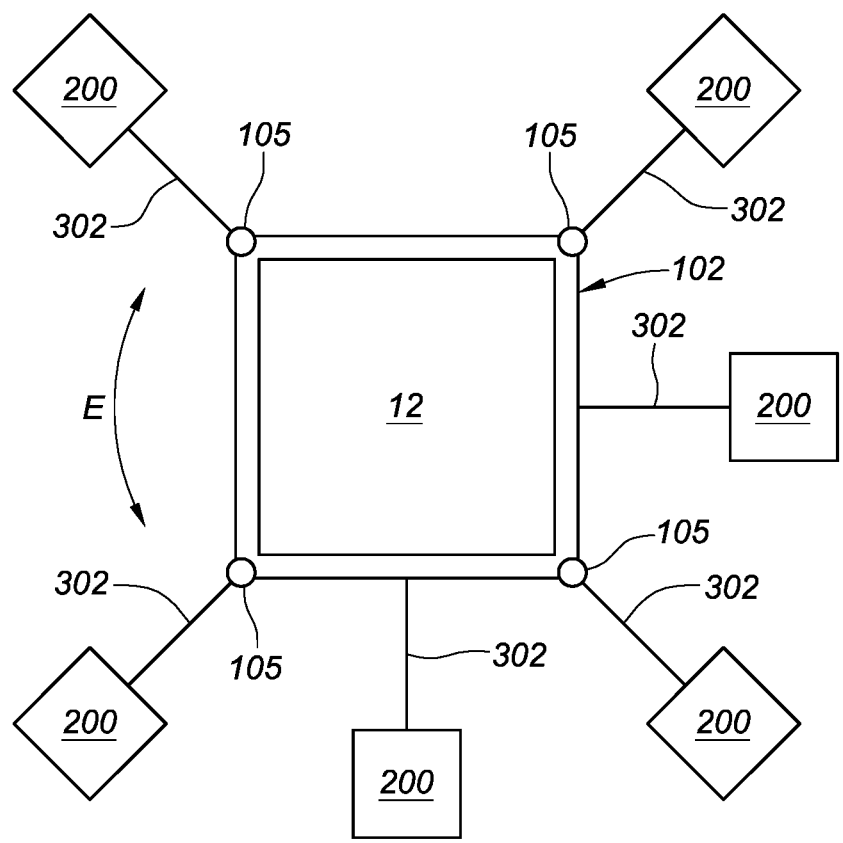

In one exemplary embodiment hereof, the mounting system 100 may include a collar or ring assembly 102 as shown in FIGS. 2, 3A and 3B. FIG. 3A is taken from the perspective of the cut lines D-D in FIG. 2, and FIG. 3B depicts the mounting system 100 taken from a similar perspective and incorporated with a structure 12 having a generally square cross-section. The ring assembly 102 may include a movement collar or ring 103 that may encircle or generally surround at least a portion of the outer circumference or surface of the tower 12 and that may be configured thereto. In this way, the movement ring 103 may be oriented somewhat concentrically around the tower 12. The ring assembly 102 may be adapted to rotate around at least a portion of the tower's circumference or surface (represented by the arrow E), and move up and down along at least a portion of the height of the tower 12 (represented by the arrow F).

In the case of generally circular cross-sectional structures 12 and/or generally circular movement rings 103, the movement ring 103 may have an inner diameter that may be slightly greater than the outer diameter of the portion of the tower 12 that the movement ring 103 may encircle. In this way, the movement ring 103 may encircle the tower 12 and move freely about it.

In the case of non-circular cross-sectional structures 12, such as structures with square cross sections, rectangular cross sections, octagonal cross sections, or any other non-circular shaped cross sections, the widths of the movement ring 103 may be larger than the corresponding widths of the cross section of the structure 12 when the movement ring 103 may surround the structure. In this way, the movement ring 103 may surround the tower 12 and move freely about it.

The movement ring 103 may be formed as a flexible structure such as a chain, a band, a rope, a cord, a cable or other flexible structures or combinations of flexible structures, as a less flexible structure such as a solid loop or ring, or any combination thereof. In any case, it may be preferable that the movement ring 103 be formed of a lightweight material such as plastic, (e.g., Teflon, PVC, uPVC, Polycarbonate, ABS or other type of plastic), composites, or any other type or combination of types of materials. In this way, the movement ring 103 may be more easily lifted and moved by unmanned aircraft systems (UASs) such as propellered drones (as will be described in later sections). Other materials such as aluminum, steel or other materials may be used.

FIG. 3A shows the movement ring 103 configured with and encircling the circumference of a tower structure 12 with a generally circular cross-sectional shape. FIG. 3B shows the movement ring 103 configured with and encircling the circumference of a tower structure 12 with a generally square cross-sectional shape. For the embodiment shown in FIG. 3B, it may be preferable that the movement ring 103 be formed as a chain or other flexible structure as described above. In this way, the movement ring 103 may bend and generally form itself around the different curvatures (e.g., the corners) of the outer circumference of the tower 12. In addition, because it may be flexible, the movement ring 103 may rotate about the tower 12 (represented by the arrow E) while bending and forming itself around the curvatures of the tower 12.

The mounting system 100 may also include cogs, sprockets, gears, rollers, wheels, slots, channels or other types of rotational guide mechanisms 105 that may support the movement ring 103 as it rotates about the tower 12. In the example shown in FIG. 3B, the rotational guides 105 may be positioned on each corner edge of the tower 12 and the movement chain 103 may bend around the guides 105 as it travels around. In this way, the guides 105 may facilitate the rotational movement of the movement ring 103 around towers 12 that may include abrupt transitions such as corners or other types of edges.

The mounting system 100 may also include longitudinal guides 107 that may engage the rotational guides 105 to facilitate their movement in longitudinal directions along the height of the tower 12 (best seen in FIG. 2). The longitudinal guides 107 may include tracks, recesses, grooves, rails, smooth sections, rods, bars, slots, pulleys, gears, guides, magnets or other elements or types of guide mechanisms 107 that may act to guide, direct, lead, contain, hold, restrict or otherwise affect the movement of the rotational guides 105 on the tower 12. The rotational guides 105 may include rollers, wheels, bearings, magnets or other mechanisms that may engage with the guides 107 so that the guides 105 may move along them. In the example shown in FIG. 3B, the longitudinal guides 107 may be configured vertically along the corner edges of the tower 12. In this way the movement ring 103 may rotate around the tower 12 while simultaneously moving up and down the tower 12.

It may be preferable that as the rotational guides 105 may move along the longitudinal guides 107 that they may also remain secured to them. In this way, the rotational guides 105 preferably do not fall off the guides 107 or otherwise become inadvertently disengaged. This may ensure that the ring assembly 102 also remains secured to the guides 107 and to the tower 12.

Note that in this example, the longitudinal direction may be defined as the direction generally following the vertical height of the tower 12 from the bottom of the tower 12 to the top of the tower 12 (as represented by the arrow F in FIG. 2). It is understood however that the longitudinal guides 107 need not be linear or exactly vertical but may also be curved, diagonal, zig-zag, spiraling, helical, or may extend in any other direction or combinations of directions along the general longitudinal direction of the tower 12.

The tower 12 may include one or more sections 109 along its height that may be specifically adapted for the movement of the collar 103. In one preferred implementation, the sections 109 may include smooth exterior surfaces that may allow the collar 103 to easily slide over the surfaces. It may also be preferable that the diameter of the tower 12 and its cross-sectional shape in these sections 109 remain somewhat consistent so that the movement collar 103 may not become jammed, stuck or otherwise obstructed by a variance in the diameter and/or shape of the tower 12.

The sections 109 and/or the movement ring 103 may include elements that may facilitate the easy movement of the ring 103. For example, the sections 109 (and the movement ring 103) may include lubrication that may decrease the friction between the sections 109 and the movement ring 103 to allow for smoother movement between the two.

The sections 109 and/or the movement ring 103 may also include bearings, rollers, brushes or other elements on their adjacent surfaces that may reduce the friction between them.

Figure 3C:
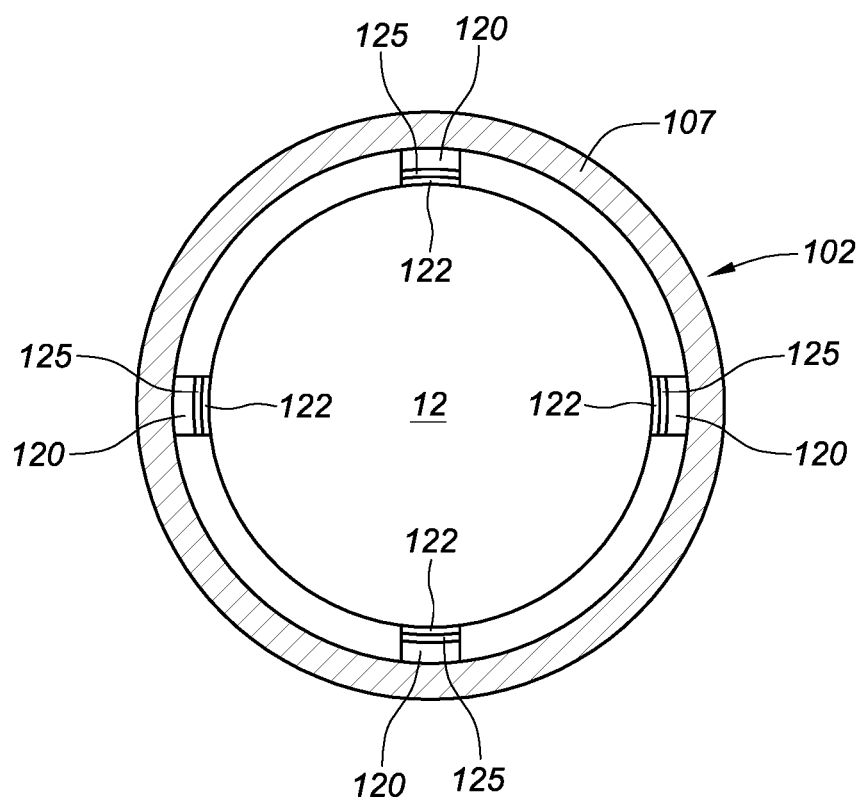

As shown in FIG. 3C, the ring assembly 102 may include ring supports 120 that may engage an outer surface of the tower 12 and provide support to the ring assembly 102. The ring supports 120 may generally extend from an inner portion of the movement ring 103 to an outer portion of the tower 12. In this way, the supports 120 may hold the ring assembly 102 concentric in relation to the tower 12.

The ring supports 120 may each include a movement mechanism 122 that may each engage an outer portion of the tower 12. The movement mechanism 122 may be a wheel, a roller, a brush or any type of mechanisms or combinations of mechanisms that may allow for the movement mechanism 122 to engage and travel along the outer portion of the tower 12. It may be preferable that the ring supports 120 and associated movement mechanisms 122 support the ring 103 at a uniform distance from the outer portion of the tower 12 while allowing the ring assembly 102 to move freely in any direction along the tower 12.

The ring supports 120 and/or movement mechanisms 122 may also include shock absorbers that may compensate for variations in the tower's diameter and/or cross-sectional shape. The shock absorbers may also compensate for obstructions along the exterior of the tower 12 such as bumps, protrusions or other obstacles. The shock absorbers may include springs, rubber mounts, pneumatic cylinders or other types of shock absorbers that may allow for the contraction and extension of the ring supports 120 and/or the movement mechanisms 122.

The movement mechanisms 122 may also engage the longitudinal guides 107, and the guides 107 may guide, lead, direct, contain, hold, restrict or otherwise affect the movement of the movement mechanisms 122 on the tower 12.

The ring assembly 102 may include one or more ring assembly propulsion mechanism 125 (best seen in FIG. 3C) that may propel or otherwise move it along the outer portion of the tower 12 as desired. In some preferred implementations, the propulsion mechanisms 125 may include electric motors, hydraulic motors, pneumatic motors, or any other types or combination of types of propulsion mechanisms 125. The propulsion mechanisms 125 may engage with the movement mechanisms 122 and/or the guide mechanisms 107 to move the movement mechanisms 122 along the outer portion of the tower 12. In this way, the ring assembly 102 may be moved.

As will be described in later sections, the tethered UASs 200 may also be utilized to propel or otherwise move the ring assembly 102 about the tower 12. As an alternative, the UASs 200 and propulsion mechanisms 125 may work together.

As described, the ring assembly 102 may travel, rotate or otherwise move up, down and around the outer portion of the tower 12. In this way, a fixed point on the ring assembly 102 (e.g., on the movement ring 103) may be moved to any location along the outer portion (e.g., the circumference) of the tower 12 where the ring assembly 102 may travel. As described in later sections, the tether system 300 and the UASs 200 may be configured with the movement ring 103 so that they too may move to any location along the outer portion of the tower 12 where the ring assembly 102 may travel.

Figure 4:
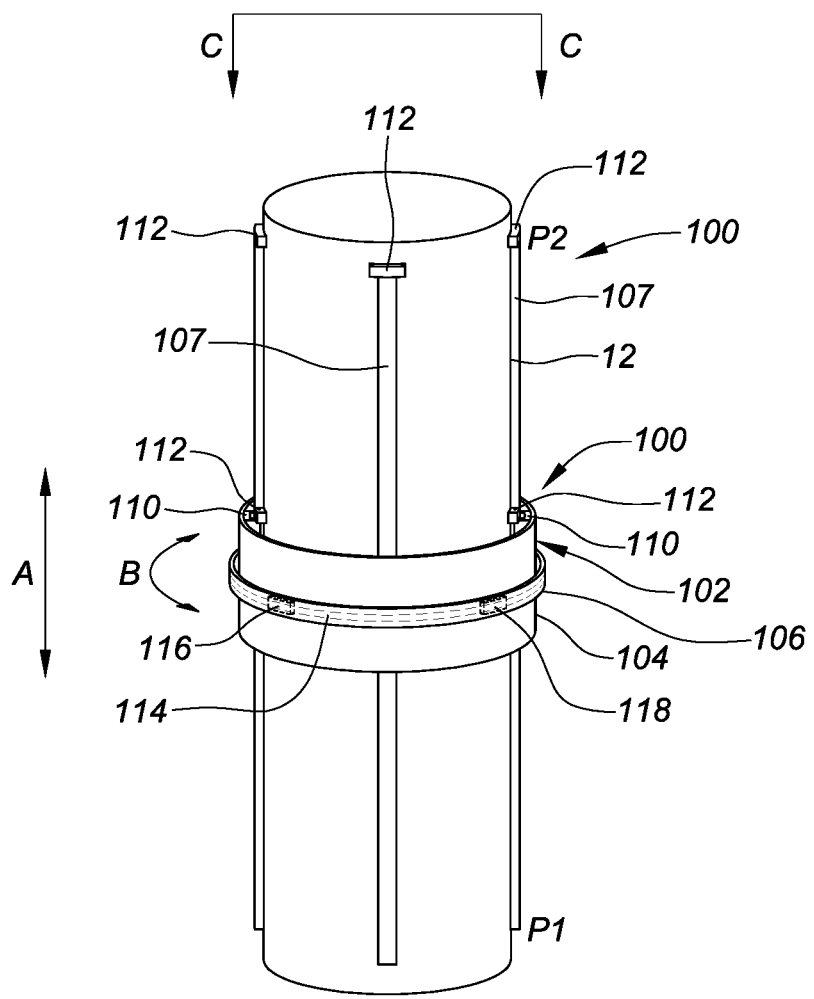
Figure 5:
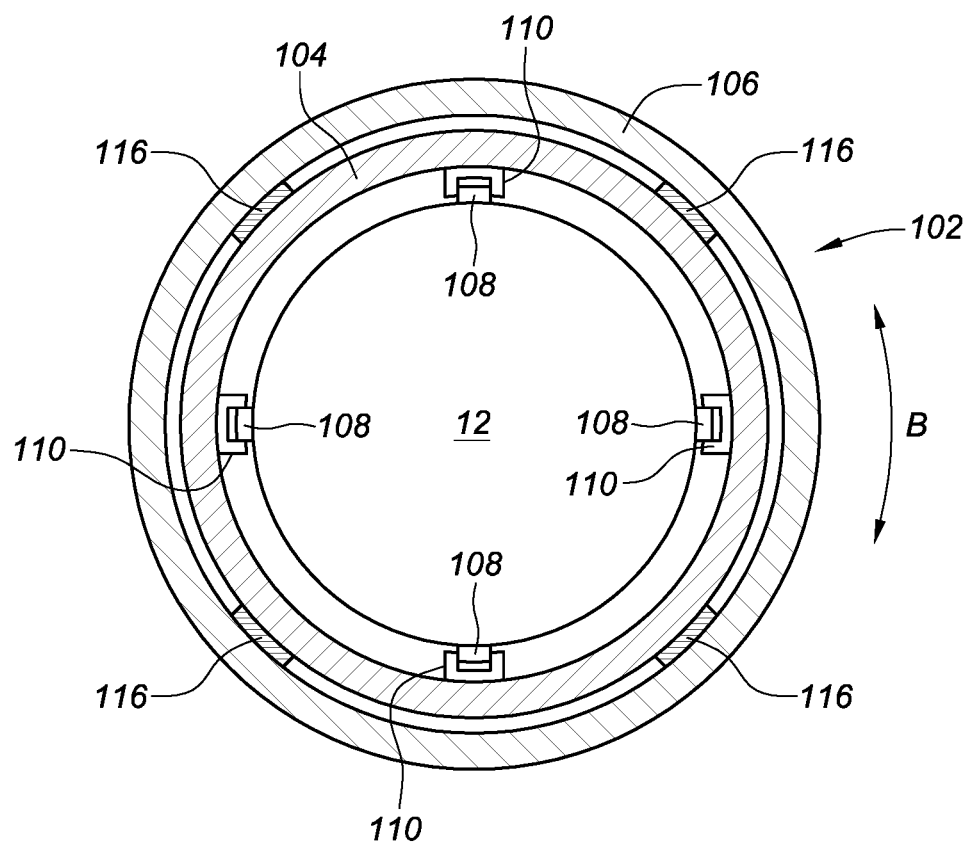

In another exemplary embodiment hereof, the mounting system 100 may include a ring assembly 102 as shown in FIGS. 4 and 5. FIG. 5 is taken from the perspective of cut lines C-C in FIG. 4. The ring assembly 102 may include an inner ring 104 and an outer ring 106. The inner ring 104 may encircle at least a portion of the outer circumference of the tower 12 and may be configured thereto. In this way, the inner ring 104 may be oriented somewhat concentrically around the tower 12. The inner ring 102 may be adapted to move up and down along at least a portion of the height of the tower 12 (represented by the arrow A) as described in later sections. It may be preferable that the inner ring 104 include a shape that may correspond to the cross-sectional shape of the tower 12 (e.g., circular), however the inner ring 104 may include any other shapes or forms such as square, octagonal, oval or other shapes.

The outer ring 106 may encircle at least a portion of the circumference of the inner ring 104 and may be configured thereto. In this configuration, the outer ring 104 may be oriented somewhat concentrically around the inner ring 104. The outer ring 106 may be adapted to rotate around the inner ring 104 (represented by the arrow B) as described in later sections. In this way, the inner ring 104 may travel up and down along the height of the tower 12 and the outer ring 106 may simultaneously rotate around the inner ring 104. It may be preferable that the outer ring 106 include a shape that may correspond to the circumferential shape of the inner ring 104 (e.g., circular), however the outer ring 106 may include any other shapes or forms such as square, octagonal, oval or other shapes.

As shown in FIG. 5, the ring assembly 102 may also include ring assembly carriages 110 or other types of mechanisms that may be configured to engage with and travel along the longitudinal guides 107. The carriages 110 may be configured with the inner ring assembly 104 to support it and to move it along the guides 107.

The carriages 110 may include wheels, rollers, bearings, gears, sprockets, rotators or other mechanisms that may engage the guides 107 (e.g., the tracks) and move freely and securely along them. It may be preferable that as the carriages 110 may move along the guides 107 that they may also remain secured to them. In this way, the carriages 110 may remain connected to the guides 107 and not become inadvertently disengaged. This may ensure that the ring assembly 102 also remains secured to the guides 107 and to the tower 12.

The mounting system 100 may also include one or more ring assembly propulsion mechanisms 112 that may propel or otherwise move the carriages 110 and/or the ring assembly 102 along the guides 107 as desired. In some preferred implementations, the propulsion mechanisms 112 may include electric motors, hydraulic motors, pneumatic motors, or any other types or combinations of types of propulsion mechanisms 112. The propulsion mechanisms 112 may be configured with the carriages 110, the ring assembly 102, the guides 107 or any combination thereof. The propulsion mechanisms 112 may engage with the carriages' wheels or gears to move the carriages 110 along the tracks 107. The guides 107 and/or propulsion mechanisms 112 may also include cables and pulleys that may engage with the carriages 110 to pull and/or push them along the guides 107.

As described above, the outer ring 106 may encircle at least a portion of the inner ring 104, and may be adapted to rotate around it concentrically as represented by the arrow B in FIGS. 4 and 5. To facilitate this, the inner ring 104 may include a ring guide 114 that may generally extend around at least a portion of its outer circumference and that may be adapted to engage with the outer ring 106. The ring guide 114 may be a slot, a groove, a track, a rail, a bar, a magnet or any other type of ring guide mechanism 114 or combination of guide mechanisms 114.

The outer ring 106 may include outer ring carriages 116 that may be adapted to engage with the ring guide 114 and move freely and securely along it. It may be preferable that as the carriages 116 may move along the guides 114 that they may remain secured to them. In this way, the carriages 116 may remain attached to the guides 114 and not become inadvertently disengaged. This may ensure that the outer ring 106 also remains secured to the ring guides 114.

The carriages 116 and/or the outer ring 106 may include one or more outer ring propulsion mechanisms 118 that may move the carriages 116 and the outer ring 106 along the ring guides 112 as desired. In some preferred implementations, the propulsion mechanisms 118 may include electric motors, hydraulic motors, pneumatic motors, or any other types or combination of types of propulsion mechanisms 118. The propulsion mechanisms 118 may be configured with the outer ring carriages 116, the outer ring 106, the ring guides 112, the inner ring 104 or any combination thereof. The propulsion mechanisms 118 may also include cables and pulleys that may engage with the carriages 116 to pull and/or push them along the tracks 112.

As described, the inner ring 104 may travel up and down along the height of the tower 12 and the outer ring 106 may simultaneously rotate around the inner ring 104. In this way, a fixed point on the outer ring 106 may be moved to any location along the outer portion of the tower 12 where the ring assembly 102 may travel as desired. As described in later sections, the tether system 300 and the UASs 200 may be configured with the outer ring 106 so that they too may move to any location along the outer portion of the tower 12 where the ring assembly 102 may travel.

As will be described in later sections, the tethered UASs 200 may also be utilized to propel or otherwise move the ring assembly 102 about the tower 12, alone or in combination with the propulsion mechanisms 118.

Any and/or all of the embodiments of the mounting system 100 may be combined in any way. For example, elements of one type or embodiment of the ring assembly 102 may be combined with elements of another type or embodiment of the ring assembly 102. In one example, the inner ring 104 may include movement mechanisms 122 but not ring supports 120. In another example, the system 10 and the mounting system 100 may include one or more ring assemblies 102 with inner and outer rings 104, 106, and/or one or more ring assemblies 102 with rings 103. In another example, one or more ring assemblies 102 may include more than one inner and outer rings 104, 106, and/or more than one ring 103, or any combination thereof. In this example, the plurality of outer rings 106 and/or the plurality of rings 103 may rotate in opposite directions and/or at different speeds around the tower 12.

The mounting system 100 may also include individual carriages that may travel along the guides 107. This may be in addition to, or as an alternative to the ring assemblies 102. The individual carriages may be movably secured to the guides 107 using wheels, rollers, cords, pulleys, gears or any other type of movable attachment mechanism. The tether system 300 and the UASs 200 may be configured with the individual carriages and may thereby travel in tandem with the carriages. The UASs 200 may also provide for the movement of the carriages. The individual carriages may include lights, water delivery devices, sound systems as well as other visual, audio or sensory enhancement elements to enhance the overall impression of the system 10.

In addition, the mounting system 100 may include one or more water delivery devices to spray, emit or otherwise release water, one or more lights to illuminate the emitted water streams, itself and/or other elements of the system 10 and/or other structures, one or more sound systems to broadcast sound (e.g., music, sound effects, narration, etc.) or other elements as mentioned above or as otherwise required by the system 10.

The mounting system 100 may also include docking stations to receive the UASs 200 when the UASs 200 may not be utilized. The docking stations will be described in later sections with respect to the UASs 200 and the tethers 302.

The UASs and the Tether System

Figure 6:
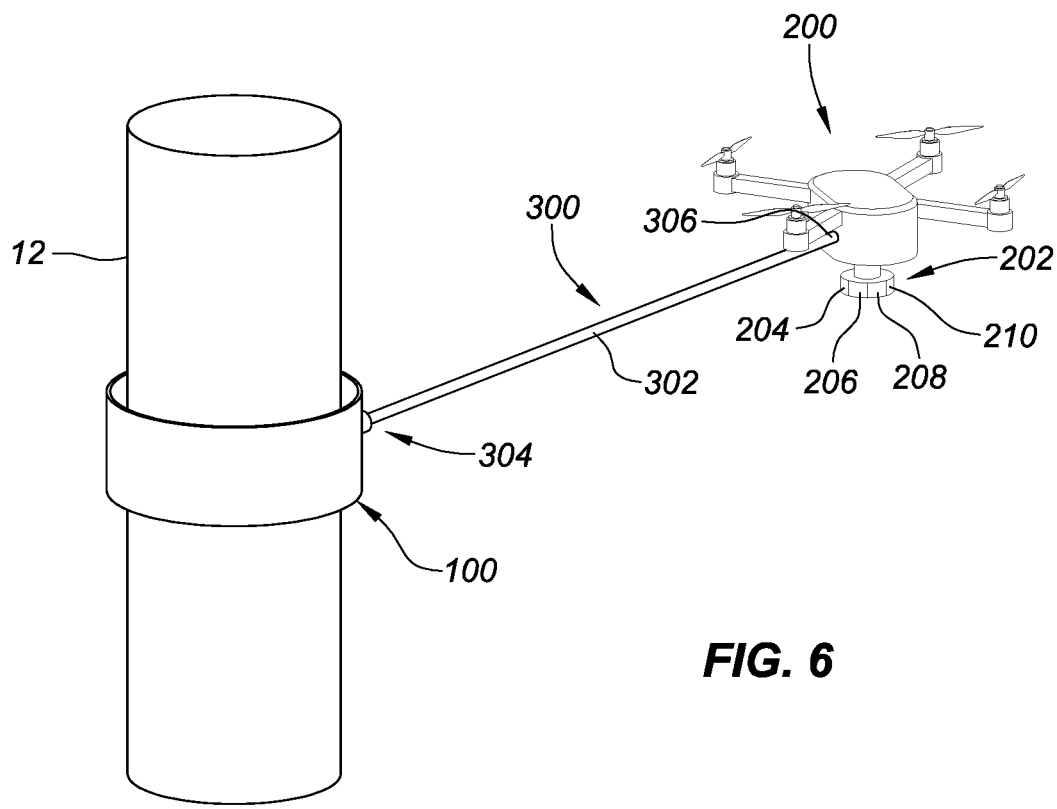

Referring now to FIGS. 5 and 6, the UASs 200 and the tether system 300 of the system 10 according to exemplary embodiments hereof will be described in further detail. In general, the tether system 300 may include tethers that may extend from the mounting system 100 to the UASs 200, thus tethering the UASs 200 to the mounting system 100 and the tower 12.

In one exemplary embodiment hereof, one or more unmanned aircraft systems (UASs) 200 may be provided as part of or in addition to the system 10. The UASs 200 may be equipped with different types of payloads 202 such as high intensity lights 204 (e.g., LEDs, spotlights, etc.), water delivery devices 206 (e.g., water jets), sound devices 208 (e.g., speakers/transducers), sound cancellation devices 210, and other types of payloads. It is understood that each UAS 200 may include the same or different types of payloads or combinations of payloads compared to other UASs 200 and that the payloads 202 need not match.

The lights 204 may include lights that may be aimed at structures that may be exterior to the system 10. In this way, the lights 204 may be used to illuminate other structures such as water displays and their associated water streams, unmanned aircraft systems (UASs) and their payloads and/or emitted water streams, buildings, statues and other structures. The lights 204 may also be used to illuminate the water streams emitted by the same UASs but from outside the water streams.

The water delivery devices 206 may include any type of device that may shoot or otherwise emit water such as water nozzles, Shooters®, water jets, or other types of water delivery devices 206. Each UAS 300 may include multiple water delivery devices 206, and more than one type of the water delivery devices 306 and the types need not match. Any type of water stream, such as laminar streams, water droplets or other shapes or forms of water may be emitted.

The water delivery device 206 may also include lights 212 that may be positioned to launch light into the streams and/or droplets of water that may be emitted. In this way, the water streams and/or droplets may be illuminated as they launch from the water devices 206. In one preferred implementation, the lights 212 may be LEDs configured with optical fibers that may transmit the light into the water streams and/or droplets from the water delivery device 208. The lights 212 may transmit white light, colored light or any combination thereof.

Figure 7:
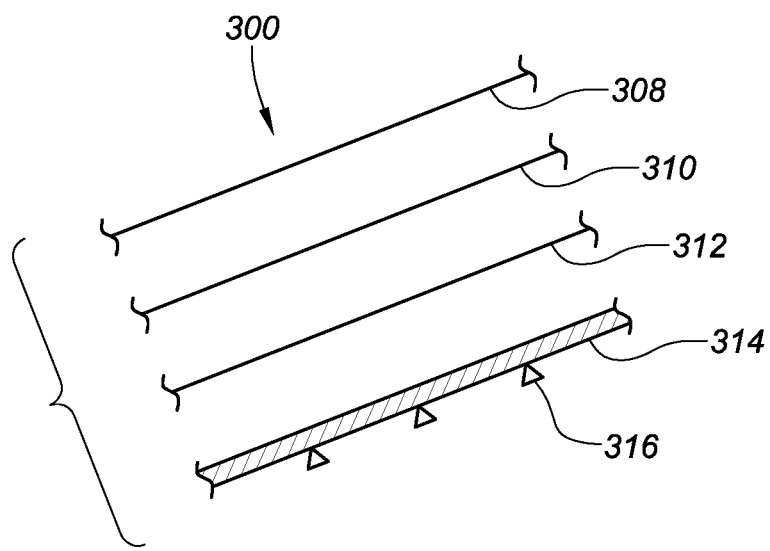

As shown in FIGS. 6 and 7, the tether system 300 may include at least one tether 302 that may extend from the mounting system 100 to at least one UAS 200. A first end 304 of the tether 302 (e.g., the proximal end) may be secured to the mounting system 100 (e.g., the ring assembly 102). It may be preferable that the first end 304 be securely and fixedly attached to the ring assembly 102. In this way, the first end 304 of the tether 302 may be held in a fixed location on the ring assembly 102 to avoid becoming inadvertently disengaged. Alternatively, it may be preferable that the first end 304 of the tether 302 be attached to the mounting system 100 (e.g., the ring assembly 102) in a way that is not fixed to one spot or location, but instead may slide, move or otherwise travel along a portion of the ring assembly 102. For example, the first end 304 may be slidably attached to a rail such that it may slide along the distance of the rail. The rail may extend up and down, side to side, or in any other orientation or combinations of orientations. Other types of slidable and/or movable junctions may also be utilized. This may allow the tether 302 and its associated UAS 200 additional freedom of motion.

A second end 306 of each tether 302 (e.g., the distal end) may be attached to at least one UAS 200. It may be preferable that the second end 306 be attached to the UAS 200 in such a way to avoid becoming inadvertently disengaged. In this way, the UAS 200 may be tethered to the mounting system 100 (e.g., the ring assembly 102).

In some implementations, each tether 302 may be 100 meters long, 150 meters long, or other lengths. In addition, it is understood that different tethers 302, that may be configured with different UASs 200, may each have the same or different lengths, and that the lengths of the different tethers 302 need not match.

The lengths of the tethers 302 may be variable or otherwise adjustable, in real time or otherwise. In one example, the mounting system 100 and/or the tether system 300 may include mechanisms such as spools that the tethers 302 may be wound upon. The spools may unwind the tethers 302 to extend the length of the tethers 302, and wind the tethers 302 to reduce the length of the tethers 302. This may be controlled by the control system 400. The system 10 may also use other mechanisms or means of extending or reducing the length of the tethers 302 in real time or otherwise.

It may be preferable that each tether 302 extending to each UAS 200 may include, without limitation:

1. At least one support tether 308;
2. At least one control line 310;
3. At least one power line 312; and/or
4. At least one water line 314.

Other types of lines, tethers or structures may also be included as required by the system 10. It may be preferable that each tether 302 include at least one support tether 308, at least one control line 310, at least one power line 312 and at least one water line 314. However, it is understood that this may not be required and that each UAS 200 may include only one or more of a support tether 308, a control line 310, a control line 312, a water line 314 or any other elements.

Each support tether 308 may include a cord, cable, rope, line, wire or other type of support tether 308 of sufficient strength that may adequately physically tether the UASs 200 to the mounting system 100, and/or hold the UAS 200 without breaking. It may be preferable that the support tethers 308 may withstand the forces that may be applied to it from the UASs 200, the mounting system 100, the water that may emit from the UASs 200 (see below), weather elements, and/or any other forces.

Each control line 310 may be any type of communications transmission line that may transmit signals to and from the UASs 200. The control line 310 may be a cable, wire, coaxial cable, optical fiber, network cable, twisted pair, or any other type of communications line. The control line 310 may transmit any type of signal, communication or protocol, including but not limited to: digital signals, analog signals, modulated signals, IR signals, optical signals, acoustic signals, or any other types of signals. The control lines 310 may also transmit signals at any frequency or combinations of any frequencies. The control lines 310 may carry signals from the control system 400 to the UASs 200, and signals from the UASs 200 to the control system 400 as will be described in other sections. Note that the UASs 200 may also be controlled using wireless signals such as radio frequency (RF), microwave, millimeter wave, IR, or any other type of wireless signals, communications, protocols or methods. In this case, the UASs 200 may or may not require the control lines 310.

Each power line 312 may include a power transmission line of any kind that may deliver power from a power source(s) to the UASs 200. It may be preferable that the power transmitted through the power lines 312 may be sufficient to power all of the required functionalities of the UASs 200 and the associated payloads 202, and that the power lines 312 may be able to withstand the transmission of the required power. The power may be AC, DC, any combination thereof, or any other kind of power. The delivered power may provide power to, without limitation: the propulsion motor(s), the communications receiver, the communications transmitter, the lights 204, the water delivery devices 206, the sound devices 208, the sound cancellation devices 210, and any other UAS system, component, element or mechanism that may require power. In this way, the UASs 200 may not be required to carry an onboard power supply such as a battery. Given that onboard power supplies may be heavy, removing the need to carry an onboard power supply may allow the UASs 200 to more easily maneuver, to carry other payloads instead, to require less energy to fly, to have longer flights as well as other benefits.

Each water line 314 may carry or otherwise provide water (or any other liquids) to the UASs 200. The water may then be shot, sprayed or otherwise released by the UASs 200 via the water delivery devices 206 that the UASs 200 may include. To this end, a water line 314 may be connected to a source of pressurized air, which when released, may create a water shot, such as in a Shooter® device. It may be preferable that the water lines 314 be adequately flexible so that the water lines 314 may not interfere with the movements and flights of the UASs 200. It may also be preferable that the water lines 314 have adequate diameters so that the lines 314 may deliver an adequate volume of water to the UASs 200 as required by the system 10. The diameter of the water lines 314 need not be uniform along the lengths of the water lines. It may also be preferable that the water lines 314 (when filled with water) be sufficiently lightweight so that the water lines 314 (filled with water) may not create significant drag on the UASs 200 or otherwise compromise their flight. For example, the water lines 314 may comprise polyurethane or other types of polymers or materials.

The water lines 314 may include one or more water delivery devices 316 (e.g., perforations, holes, nozzles or other types of water delivery devices) along the length of each line 314 that may spray, shoot or otherwise release water. The water delivery devices 316 may be located at intervals along the length of the lines 314 at any spacings. It is understood that not each line 314 may be required to include the water delivery devices 316. It is also understood that different UASs 200 may include different types and/or numbers of water delivery devices 316, and at different intervals and/or locations along the lines 314, and that the types, numbers and intervals of water delivery devices 316 need not match. The water delivery devices 316 may be passive devices or active devices, and may be controlled by the control system 400 via the control lines 310, or by any other controller or method.

Portions or the entire lengths of at least some of the water lines 314 may be transparent or opaque, and may include water line lights 318 that may illuminate the water lines 314. In this way, the water lines 314 may also act as glowing light lines. The water line lights 318 may be positioned to launch light into the inner cavity of the lines 314 such that the lights 318 may illuminate the lines 314 from the inside. In one preferred implementation, the lights 318 may be LEDs configured with optical fibers that may transmit the light into the ends of the water lines 314. The lights 318 may be configured with the mounting system 100 to shine light into the proximal end of the water lines 314, or may be configured with the UASs 200 to shine light into the distal end of the water lines 314. The lights 318 may transmit white light, colored light or any combination thereof.

In one exemplary embodiment hereof, the UASs 200 may provide the propulsion of one or more ring assemblies 102. For example, the ring assemblies 102 may not include propulsion mechanisms 112, 118, 107 (or may have them disengaged) and may instead be moved, pulled or otherwise propelled by the UASs 200 and the tethers 302. It may be preferable that the rings 103, 104, 106 of the ring assemblies 102 move freely so that they may not obstruct the movement of the UASs 200. It may also be preferable that the UASs 200 fly in choreographed and/or synchronized flight patterns (e.g., controlled by the control system 400 as described below or otherwise) so that the UASs 200 may move together to propel and move the ring assemblies 102 up and down and around the tower 12. In addition, some ring assemblies 102 may be propelled by the UASs 200, some of the ring assemblies 102 may utilize propulsion mechanisms 112, 118, 107 for propulsion, or any combination thereof.

The Control System

In one exemplary embodiment hereof, the system 10 may include a control system 400. The control system 400 may include any type of controller(s) 402, including but not limited to, one or more computers, servers, laptops, smartphones, mobile devices, tablet computers or any other type of controller or combinations of controllers. The controller(s) 402 may include CPUs, microprocessors, microcontrollers, memory, communication interfaces (e.g. Wi-Fi, wireless, RFID, LAN, WAN, and any other type of communication interfaces for any other communication protocols or combinations of communication protocols), batteries (preferably rechargeable) or other types of power supplies, software, scripts, applications, and any other components, elements or mechanisms that may be necessary for the control system 400 to adequately perform its functionalities. The control system 400 may be a backend system (also referred to as a cloud platform)

To control the elements of the system 10, the control system 400 may be hard wired to elements of the system 10, wirelessly connected to elements of the system 10, or any combination thereof. It may also be preferable that the control system 400 communicate with the elements of the system 10 over a network such as the Internet, a LAN, a WAN, or any other type of network (wired and/or wireless).

The control system 400 may perform at least some of the following functionalities, without limitation:

1. Control the movement of the mounting system 100 with respect to the tower 12. This control may include controlling all aspects of the movement of any component and/or element of the mounting system 100 such as, but not limited to, the ring assembly 102, the movement ring 103, the inner ring 104, the outer ring 106, the guides 107, the carriages 110, the propulsion devices 112, the outer ring propulsion mechanisms 118, the movement mechanisms 122, the ring assembly propulsion mechanisms 125 and other components, mechanisms and elements of the system 10. This may include the physical movements, the timing of each movement, the speed of each movement, the position of each movement, and any other characteristics of the movements.

2. Control the flight patterns of each UAS 200. The flight patterns of each UAS 200 may be choreographed and synchronized with each element of the system 10 as well as with elements of other structures, crafts and/or displays (e.g., nearby water displays, other UASs that may not be a part of the system 10, etc.). For example, the flight patterns of the UASs 200 may be choreographed (individually or as groups) with the movement of the mounting system 100 so that as the mounting system 100 may move with respect to the tower 12, the UASs 200 may be choreographed and synchronized with this movement. In another example, the UASs 200 may be controlled, choreographed and synchronized to move the ring assembly 102 in any direction along the tower 12.

3. Control each UAS's payload device(s):
   a. Water delivery devices 206. This control may include controlling the On/Off of the water devices 206, the orientation, the angle, the shooting direction, the nozzle aperture size, the flow rate of the water into and/or out of the water delivery device 206 and other aspects of the water delivery devices 206.
   b. Lighting 204. This control may include controlling the On/Off of the lights 204, the orientation, the angle, the direction, the intensity, the color and other aspects of the lights 204. The lights 204 may be controlled to shine light onto the tower 12, the water streams that may emit from the UASs' water delivery devices 206, other UASs 200, water streams that may emit from other UASs' water delivery devices 206, other displays (e.g., water displays that may not be a part of the system 10), other structures, other crafts, or any other targets.
   c. Sound devices 208. This control may include all aspects of the sound or audio that may be emitted by the sound devices 208, including but not limited to, the type of sound or audio (e.g., music, sound effects, etc.), the volume, the direction, the balance between the frequency components of the sound (e.g., equalization), and other aspects of the sound.
   d. Sound canceling devices 210. This control may include all aspects of the sound cancelling devices 210 such as the microphone, the real time calculation of the vectorized cancelling audio, the production of the sound cancelling audio and other aspects of the sound cancelling devices 210. The sound cancelling devices 210 may cancel out some or all of the sound produced by the UASs' propulsion systems (the rotor blades).

4. Control the water line lighting 318. This control may include the On/Off control of the lighting 318, the orientation, the angle, the direction, the intensity, the color and other aspects of the lighting 318.

5. Control the flow rate, velocity and water pressure of the water flowing through the water lines 314 and to the UASs 200.

6. Control the water line water delivery devices 316. This control may include controlling the On/Off of the water devices 316, the orientation, the angle, the shooting direction and timing of the release of air other pressure to create a water shot, the nozzle aperture size, the flow rate of the water into and/or out of the water delivery device 316 and other aspects of the water delivery devices 316.

7. Control the docking of the UASs 200 (described in other sections).

The control system 400 may provide fully automated control, manual control, or any combination thereof. The control system 400 may also control other aspects and elements of the system 10 as required by the system 10. For example, the control system 400 may include UAS anti-collision systems that may use real time positional data of each UAS 200 and data regarding the choreographed flight paths of each UAS 200, to control the UASs 200 in such a way as to ensure that none of the UASs 200 collide with each other or with any other elements (e.g., tethers 302) or structures (e.g., the tower 12). The UASs 200 may also include GPS systems and the control system 400 may receive and utilize data from the GPS systems to determine the positions of the UASs 200.

In Operation

As described in other sections, the system 10 according to exemplary embodiments hereof may include a mounting system 100, one or more UASs 200, a tether system 300, a control system 400 and other systems, elements, mechanisms and components that may be required by the system 10.

For the purposes of this specification, the method and operation of the system 10 will be described with respect to a tower 12 (such as an observation tower 12) with a generally circular cross-sectional shape. However, it is understood that the system 10 may be configured with any type of structure with any type of cross-sectional shape(s) and that the type of structure with which the system 10 is configured does not limit the scope of the system 10 in any way.

As described above, the ring assembly 102 (whether it comprises one or more movement rings 103, one or more inner rings 104, one or more outer rings 106 or any combination thereof) may generally move up and down along at least a portion of the tower 12 while simultaneously rotating around at least a portion of the tower's outer circumference. In this way, the ring assembly 102 may be moved to move a fixed point on the ring assembly 102 to any location or position along the outer portion of the tower 12 where the ring assembly 102 may travel. Accordingly, it can be seen that with one or more tethers 302 configured with the ring assembly 102, and with one or more UASs 200 configured with the one or more tethers 302, that the UASs 200 may fly within flight paths that may be tethered to any location or position along the outer portion of the tower 12 where the ring assembly 102 may travel.

Because the system 10 includes systems, assemblies and components that may work together and in combination to perform the overall functionalities of the system 10, further aspects of the system 10 will now be described by way of several examples of the system 10 in operation. It is understood that in all of the examples described or otherwise, that the UASs 200 may be utilized to move the mounting system 100, and/or the ring assemblies 102, the mounting system 100 and/or the ring assemblies 102 may utilize other types of propulsion mechanisms to move, or any combination thereof.

Figure 8:
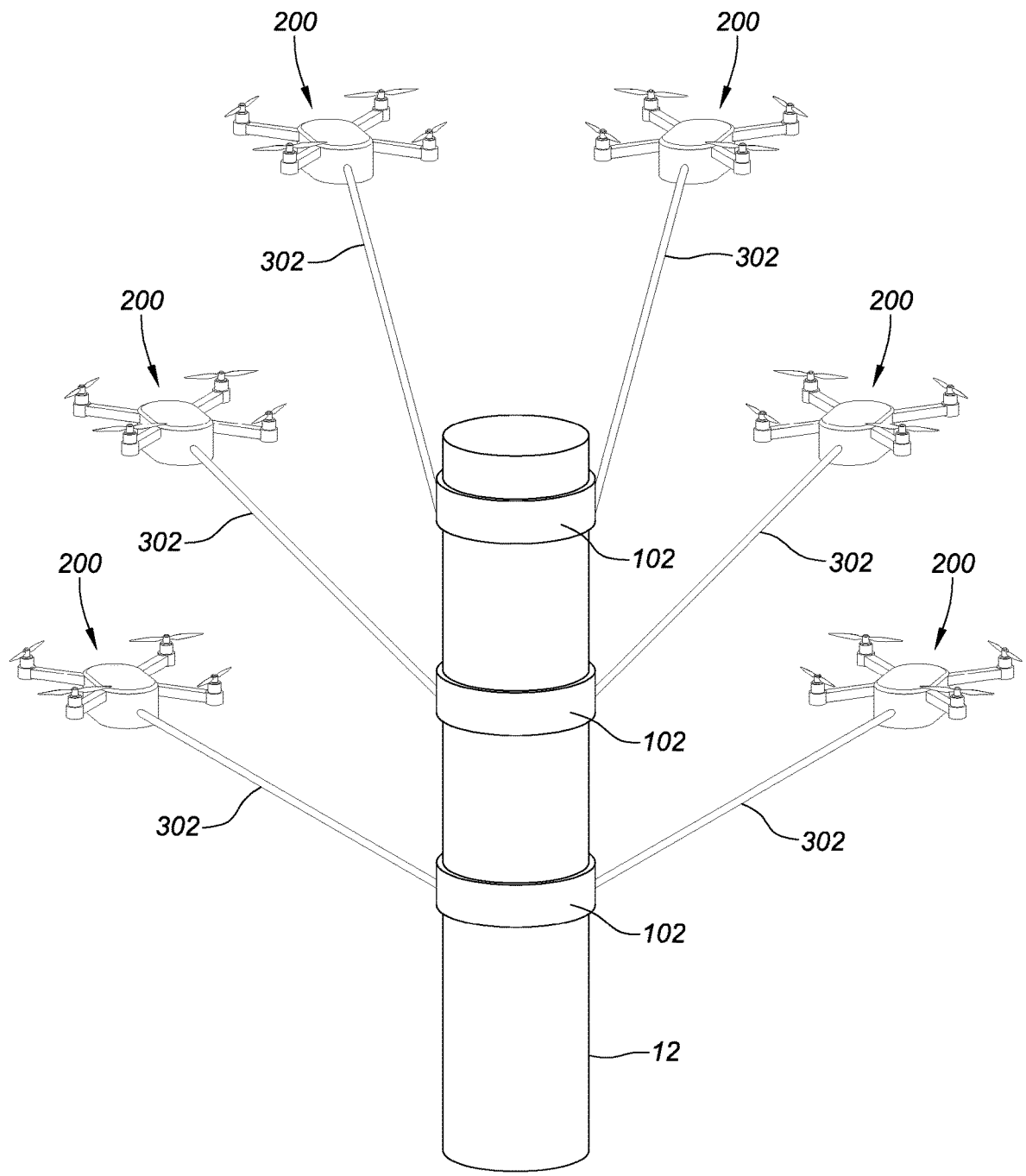

In a first example, the system 10 may include three ring assemblies 102, each configured with a plurality of tether 302/UAS 200 combinations as shown in FIG. 8. While two tether 302/UAS 200 combinations are depicted, other numbers of tether 302/UAS 200 combinations may be used. In one example of a choreographed flight pattern, the three ring assemblies 102 may be generally spread out along the height of the tower 12 and the UASs 200 may each fly upward so that the associated tethers 302 may be taught and at a slightly outward angle.

Figure 9:
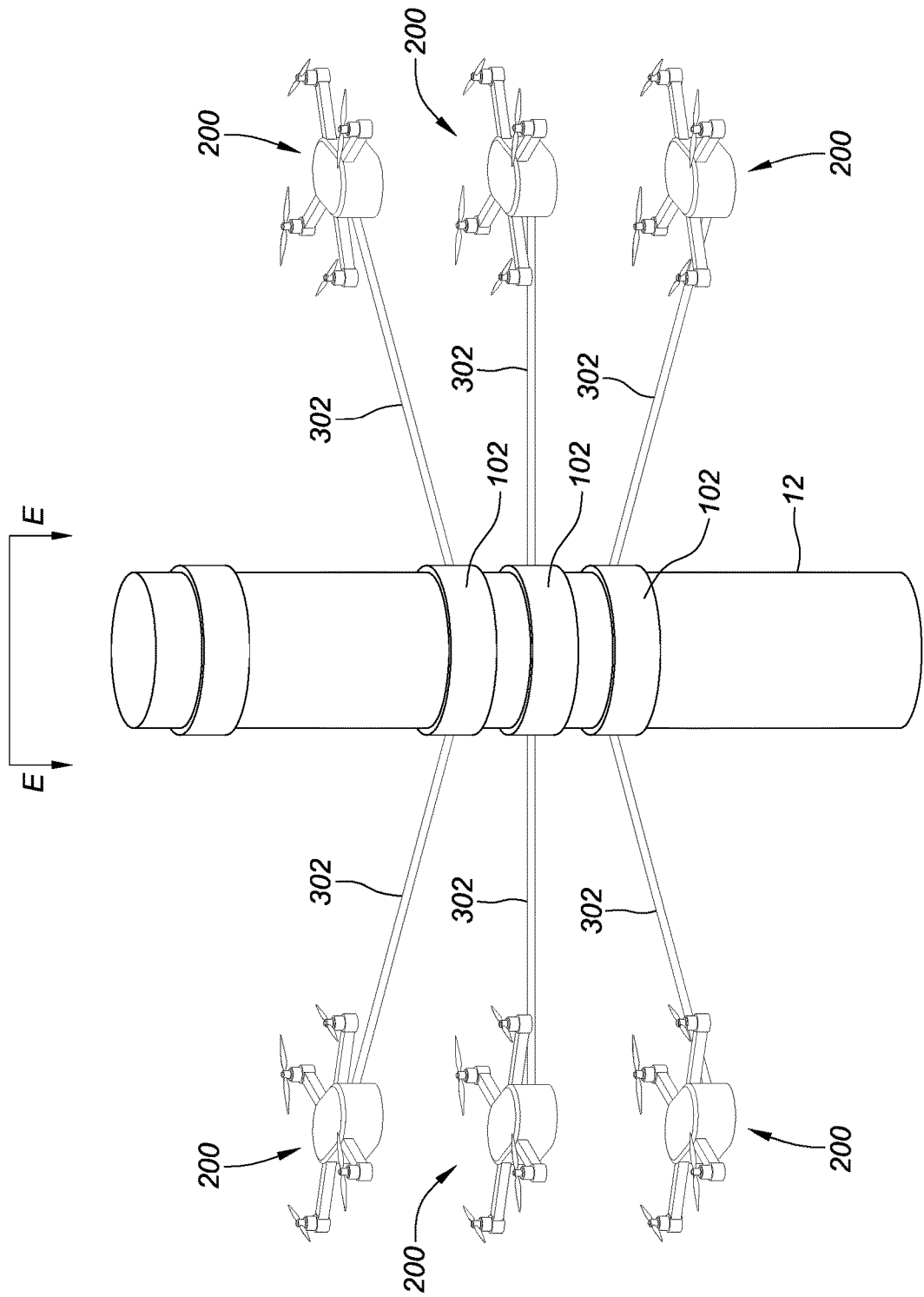

The ring assemblies 102 may then be moved to converge towards a central location along the tower 12 as shown in FIG. 9. The UASs 200 configured with the top ring assembly 102 may fly upward so that their tethers 302 may be taught and at a slightly upward angle, the UASs 200 configured with the middle ring assembly 102 may fly directly outward so that their tethers 302 may be taught and at a right angle with respect to the tower 12, and the UASs 200 configured with the lower ring assembly 102 may fly downward so that their tethers 302 may be taught and at a slightly downward angle. This formation may resemble a lighted butterfly.

Figure 10:
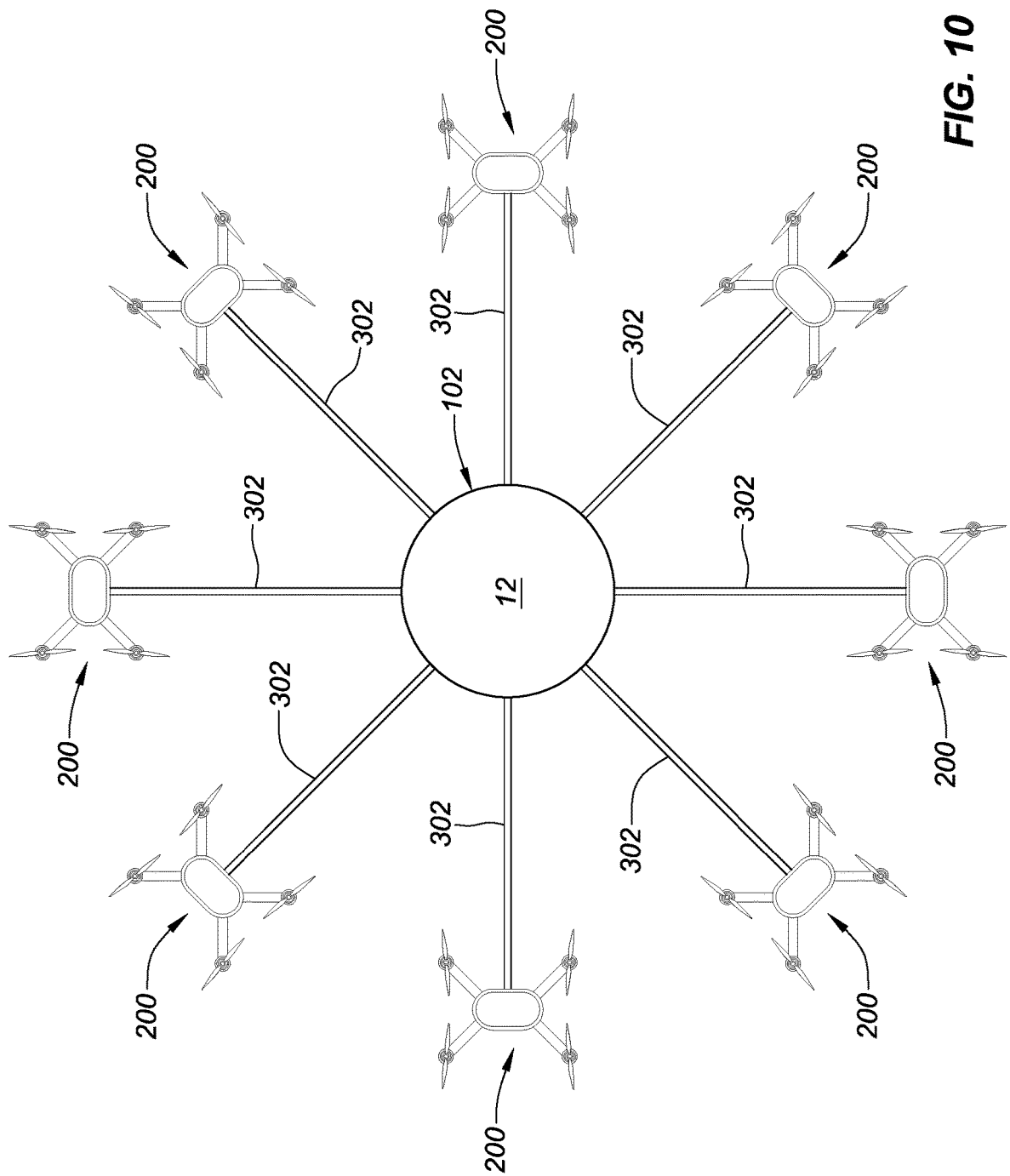

It is appreciated that while the UASs 200 and ring assemblies 102 are each moving from the first position to the second position, that the ring assemblies 102 may also be rotated around the circumference of the tower 12. In addition, the ring assemblies need not rotate around the circumference of the tower 12 in the same directions, or at the same speeds with respect to one another, and as such, the UASs 200 configured with each ring assembly 102 may also follow these respective paths and speeds. Accordingly, the UASs 200 associated with the different ring assemblies 102 may fan out and need not be aligned as shown in FIG. 10 (taken from the perspective of the cut lines E-E in FIG. 9). Note that while the positions of the UASs 200 may be shown to be generally symmetrical with respect to one another, this is not required and the UASs 200 may be in any position with respect to one another.

It is also clear that because the UASs 200 may be tethered to the ring assemblies 102, and the tethers 302 may be flexible, that the UASs 200 may have additional degrees of freedom that may be defined by the lengths of the tethers 302. In this way, the UASs 200 may fly in flight paths and patterns that may not exactly follow the paths and patterns of their corresponding ring assemblies 102.

Figure 11:
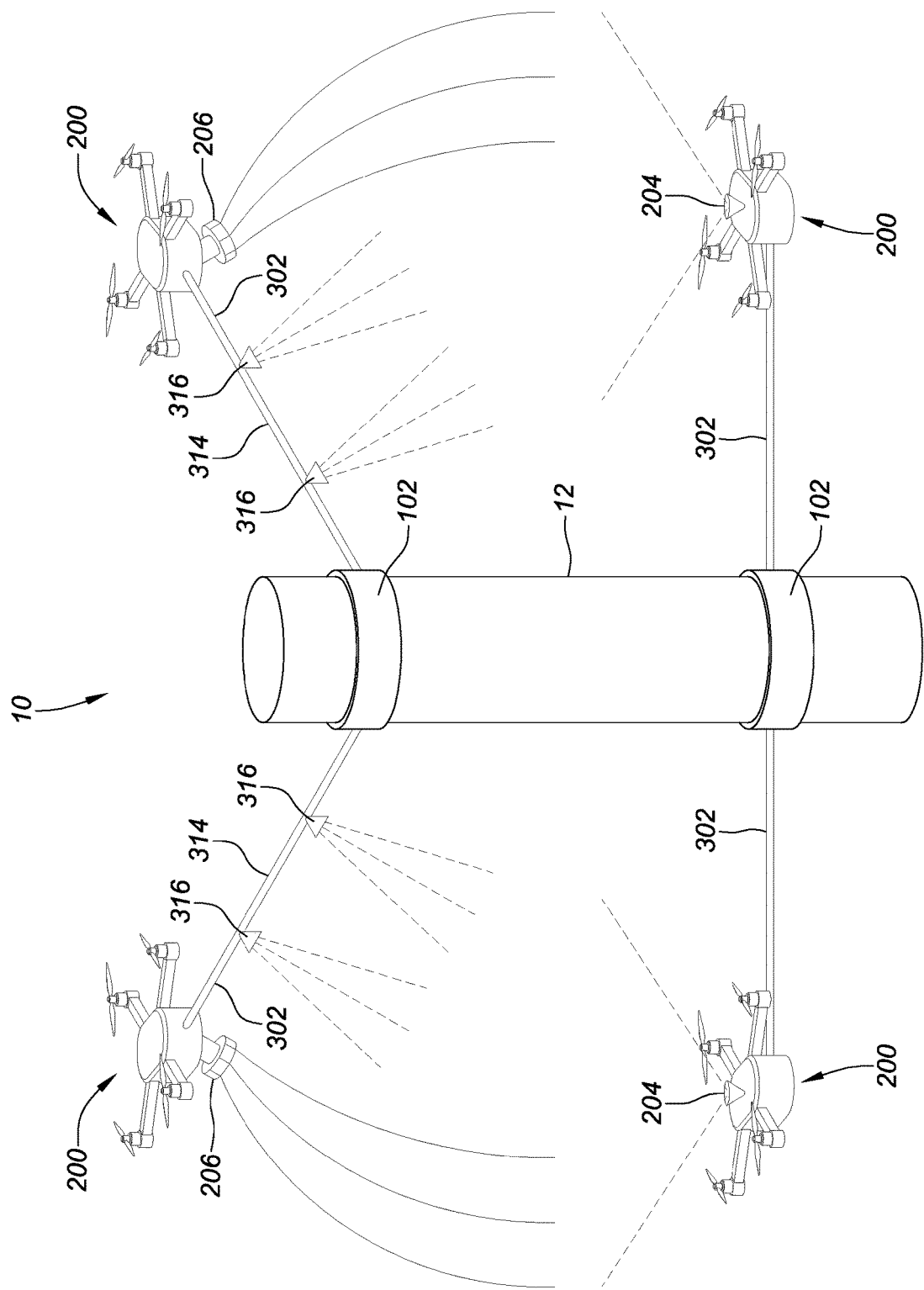

In another example as shown in FIG. 11, the system 10 may include two ring assemblies 102 each configured with a plurality of UASs 200. The top ring assembly 102 may be generally positioned at an upper position on the tower 12 and may rotate around the circumference of the tower 12. At the same time, the UASs 200 may emit water streams from their respective payload water delivery devices 206 and/or from the water line water delivery devices 316. The water streams may then fall downward from the UASs 200 and the water lines 314 as drops and/or streams of water.

Simultaneously, the second ring assembly 102 may be positioned at a lower position along the tower 12 and may rotate around the circumference of the tower 12. The UASs 200 configured with the lower ring assembly 102 may shine their lights 204 upward to illuminate the water streams and droplets that may be falling from the upper UASs 200 configured with the upper ring 102. This may provide the appearance to viewers in the observation tower, on the ground or elsewhere, of sparkling rain drops that may be falling from sky in spiraling patterns. In addition, the lower UASs 200 may be choreographed to fly between and around the glowing water streams as part of a flying obstacle course. During operation, the anti-collision system may ensure that the UASs 200 may not collide with each other or with any other element or structure.

Figure 12:
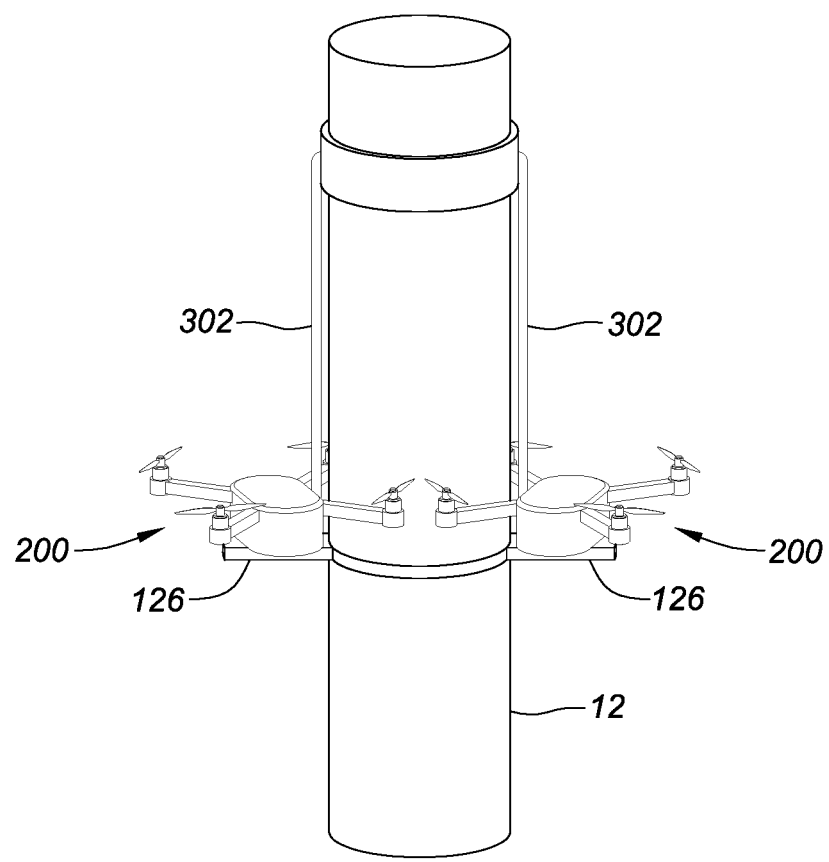

In one exemplary embodiment hereof as shown in FIG. 12, the system 10 and/or the mounting system 100 may include docking stations 126 that may receive and secure the UASs 200 when they may not be in use. The docking stations 126 may include platforms, compartments, inlets, shrouds, magnets, latches, clamps, shields, or any other types or combinations of types of structures that may generally receive and secure the UASs 200. In the example shown in FIG. 12, the docking stations 126 may include platforms upon which the UASs 200 may land but other types of docking stations 126 may be used. It may be preferable that when the UASs 200 are received by the docking stations 126, that their respective tethers 302 may be generally taught. It may also be preferable that the tethers 302 be of a color that may blend in with the color of the tower 12. In this way, the tethers 302 may not be easily discernable by viewers on the ground.

The docking stations 126 may also include compartments or inlets that may receive the UASs 200 and may generally enclose the UASs 200 to protect them from the elements. This may also hide the UASs 200 from view. The compartments may or may not at least partially extend into the body of the tower 12. The tethers 302 may also be retracted into the docking stations 126 so that they are no longer seen. Shields or shrouds may also be used to protect the UASs 200 and hide them from view. The UASs 200 may be held to the docking stations by magnets, clamps, latches or other types of securing mechanisms. Note that each element of the described docking stations 126 may not necessarily be implemented, for example, the docking stations 126 may not include platforms, but instead, the UASs 200 may simply hang down from the tethers 126. In this case, it may be preferable that the UASs 200 may be secured to the side of the tower 12 (e.g., by magnets or latches) but this may not be required.

The UASs 200 may also include shrouds, covers, body plates or other types of elements that may resemble the color, texture, or other visual elements of the tower 12. In this way, as the UASs 200 may dock they may blend with the tower 12 and be less discernable by viewers on the ground. For example, the UASs 200 may include body coverings that resemble tiles, bricks, windows or other elements of the tower 12.

In any of the embodiments described or otherwise, the water lines 314 may be illuminated by their associated water line lighting 318 to create the appearance of live glowing tentacles.

In any of the embodiments described or otherwise, the sound systems 208 may play music, sound effects (e.g., the sound of thunder or falling rain), narration (e.g., storytelling) or any other types of audio or sound.

In any of the embodiments described or otherwise, the sound cancellation devices 210 may be employed to remove, reduce or otherwise minimize the sound created by the UAS propulsion systems (motors, rotating rotors, etc.). Each sound cancellation device 210 may include all of the devices, equipment, software, algorithms and other elements necessary to monitor/sample the sound that may be emitted from its associated UAS 200, vectorially calculate the sound and phase of sound that may cancel at least a portion of the emitted sound, and transmit the sound at the proper time, location and phase to cancel the desired emitted sound from the UAS 200.

In any of the embodiments described or otherwise, the UASs 200 may include passive acoustic insulation materials and/or structures that may dampen or otherwise reduce the sound that may emit from the UASs 200. This sound may be primarily due to the UASs' motors and rotating rotor blades. The acoustic insulation materials may include graphite foam or other types or combinations of types of sound insulation material. The insulation may be formed as anechoic cones, wedges, pyramids or other shapes that may reduce the emitted sound from the UASs 200. The acoustic insulation material and/or shapes may be positioned on and/or within the UASs 200 in positions that may generally absorb, dampen or otherwise reduce sound emitting from the UASs 200.

In any of the embodiments described or otherwise, water may be provided to the system 10 by a water source or supply such as a water display, a pool, a pond, a lake, the ocean, a reservoir, a water tank or any other type of water supply or combinations of water supplies. The water may be fresh water, salt water, or any combination thereof. The water may be pumped upward through the standing structure 12 (e.g., the tower 12) using any type of pump and may be provided to the water lines 314 and the UASs 200. The water may then be released (as streams, droplets, etc.) by the water delivery devices 206, 316. The exit velocity of the water streams emanating from water delivery devices 206, 316 may also be varied, programmable or otherwise, by varying the water flow and/or pressure into the devices 206, 316. Water flow and pressure may be controlled by the control system 400. The variation in water flow and pressure may be affected by, e.g., varying the rotational speed of the water pump via a variable frequency drive. Alternatively, other types of flow control, such as variable or programmable valves, may be located in the path between the water source and the water delivery devices 206, 316.

In any of the embodiments described or otherwise, any aspects of one or more of the UASs 200 may be powered by wireless power transmission systems. For example, the propulsion system (e.g., the motors), the lights, the water delivery devices, the receiver, the transmitter, the sound systems, the sound cancellation systems, or any other systems and/or components of the UASs 200 may be powered using wireless power transmission systems. The UASs 200 may include the devices necessary to receive the wireless power and convert it to electricity. For example, the UASs 200 may include rectennas to collect the wireless power, rectification circuits to convert the AC to DC, collectors to feed the electricity to the systems to be powered, as well as any other devices, components or elements that may be required. The system 10 may include the power supplies and the transmitters (e.g., microwave power transmitters) to transmit the wireless power to the UASs 200.

In any of the embodiments described or otherwise, the system 10 may be configured with more than one standing structure. For example, the system 10 may be configured with two towers 12 that may stand side-by-side. In this case, the mounting systems 100 and the UASs 200 configured with each tower 12 may be choreographed and synchronized with the mounting systems 100 and the UASs 200 of both towers simultaneously. It is understood that the system 10 may be configured with any number of structures 12, and that the mounting systems 100 and the UASs 200 configured with each structure 12 may be choreographed with any other mounting systems 100 and/or UASs 200 configured with the same or any other structure 12.

The system 10 may be added to existing structures 12 and/or in proximity to other existing displays (e.g., water displays). The system 10 may be portable such that it may be easily added and/or retrofitted onto the structures 12 and/or displays. The system 10 may also be reprogrammable so that the choreography and/or control of the elements of the system 10 may be changed, edited, amended, revised or otherwise programmed at any time depending on its implementation. The system 10 may also be incorporated with the structures 12 and/or other displays upon their initial construction.

It is understood by a person of ordinary skill in the art, upon reading this specification, that the above embodiments and examples are meant for demonstration and conceptual purposes, and that any number of mounting systems 100, tether systems 300, and UASs 200 may be choreographed and/or synchronized with respect to one another (individually or collectively) in any way. It is also understood that any of the functionalities of each of the systems 100, 200, 300, 400 (individually or collectively) may be utilized with respect to any of the other systems 100, 200, 300, 400. For example, the lights 204 on the UASs 200 may be used to illuminate the tower 12, the ring assemblies 102, the other UASs 200, the water streams or any other elements of the system 10 and/or any elements of other structures. In another example, the water delivery devices 206 may be used to spray water into the air, onto the tower and/or onto any other structures.

It is understood that the drawings in the figures are meant to represent the different elements of the system 10 as described in the specification and that the size of the elements are not to scale. In addition, the location of the elements depicted may not represent the location of the elements with respect to the other elements.

A person of ordinary skill will understand, that any method described above or below and/or claimed and described as a sequence of steps is not restrictive in the sense of the order of steps.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A display system including an unmanned aircraft system (UAS) that flies in a flight path relative to a structure, the display system comprising:
   a mounting system that is coupled to the structure;
   a tether that has a proximal end and a distal end, wherein the proximal end is coupled to the mounting system, and wherein the mounting system allows movement of the proximal end relative to the structure; and
   a control system that controls the flight path of the UAS;
   wherein the UAS is coupled to the distal end; and
   wherein the control system controls the flight path of the UAS such that the proximal end moves relative to the structure.

2. The display system of claim 1, wherein the structure is a standing structure and the mounting system is configured to move longitudinally and rotatably relative to the structure.

3. The display system of claim 1, further comprising at least one water delivery device coupled to the UAS, and wherein the tether includes a water line that supplies water to the at least one water delivery device.

4. The display system of claim 1, wherein the tether includes a control line that provides signals to control the flight path of the UAS.

5. The display system of claim 1, wherein the mounting system includes an inner ring that longitudinally slides up and down the structure, and an outer ring that is rotatably coupled to the inner ring and to which the proximal end is coupled.

6. The display system of claim 1, further comprising a plurality of mounting systems coupled to the structure, a plurality of tethers each having a proximal end mounted to one of the plurality of mounting systems, and wherein each mounting system allows movement of the proximal ends relative to the structure.

* * * * *